(12) United States Patent
Tronquoy et al.

(10) Patent No.: US 10,584,766 B2
(45) Date of Patent: Mar. 10, 2020

(54) BEARING ASSEMBLY EQUIPPED WITH A ROLLING BEARING AND SCISSORS GEAR, IN PARTICULAR FOR A BALANCING SHAFT

(71) Applicant: Aktiebolaget SKF, Gothenburg (SE)

(72) Inventors: Nicolas Tronquoy, Fondettes (FR); Bruno Montboeuf, Saint-Cyr-sur-Loire (FR); Philippe Walter, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 9 days.

(21) Appl. No.: 16/106,144

(22) Filed: Aug. 21, 2018

(65) Prior Publication Data

US 2019/0101181 A1   Apr. 4, 2019

(30) Foreign Application Priority Data

Sep. 29, 2017   (DE) .......................... 10 2017 217 379

(51) Int. Cl.

| F16F 15/00 | (2006.01) |
|---|---|
| F16F 15/26 | (2006.01) |
| F16H 55/18 | (2006.01) |
| F16C 35/063 | (2006.01) |
| F16C 19/08 | (2006.01) |

(52) U.S. Cl.
CPC .......... *F16F 15/267* (2013.01); *F16H 55/18* (2013.01); *F16C 19/08* (2013.01); *F16C 35/063* (2013.01); *F16C 2326/01* (2013.01); *F16C 2361/61* (2013.01)

(58) Field of Classification Search
CPC .... F16H 57/0031; F16H 55/18; F16F 15/267; F16C 35/063; F16C 2361/61; F16C 2326/01; F16C 19/08
USPC ............ 74/409, 440, 445, 640; 384/499–505
See application file for complete search history.

(56) References Cited

U.S. PATENT DOCUMENTS

| 1,629,564 A * | 5/1927 | White ...................... F16H 57/12 |
|---|---|---|
| | | 74/440 |
| 2,382,846 A * | 8/1945 | Barber .................... F16H 48/10 |
| | | 74/409 |
| 3,545,296 A * | 12/1970 | Eggins ...................... F16H 1/22 |
| | | 74/410 |
| 5,181,433 A * | 1/1993 | Ueno ...................... F16H 55/08 |
| | | 74/409 |
| 6,661,986 B2 * | 12/2003 | Kitayama ............... F16H 55/18 |
| | | 74/440 |
| 8,245,591 B2 * | 8/2012 | Chen ....................... F16H 55/18 |
| | | 74/409 |
| 9,121,494 B2 * | 9/2015 | Buchleitner ........... F16H 55/18 |
| 10,253,862 B2 * | 4/2019 | Kiyosawa ................. F16H 1/32 |
| 10,330,188 B2 * | 6/2019 | Koch ................. B60G 21/0555 |

* cited by examiner

*Primary Examiner* — Victor L Macarthur
(74) *Attorney, Agent, or Firm* — Garcia-Zamor Intellectual Property Law, LLC; Ruy Garcia-Zamor; Bryan Peckjian

(57) ABSTRACT

A bearing assembly comprising a rotating shaft, a rolling bearing and a scissors gear. The bearing assembly further comprises an axial retaining system for the scissors gear onto the rolling bearing. A shield is arranged in a groove of an outer massive ring of the rolling bearing.

16 Claims, 2 Drawing Sheets

BEARING ASSEMBLY EQUIPPED WITH A ROLLING BEARING AND SCISSORS GEAR, IN PARTICULAR FOR A BALANCING SHAFT

CROSS-REFERENCE

This application claims priority to German patent application no. 102017217379.3 filed on Sep. 29, 2017, the contents of which are fully incorporated herein by reference.

TECHNOLOGICAL FIELD

The present invention relates to a bearing assembly comprising a rolling bearing and scissors gear. The bearing assembly is particularly suitable for use with a balancing shaft dedicated to be used in a motor vehicle.

BACKGROUND

Internal combustion engines are often equipped with balancing shafts systems adapted to compensate varying loads on crankshafts. As balancing shafts have eccentric balancing masses which generate heavy loads, the rotation of balancing shafts is allowed by rolling bearings mounted in supports of the internal combustion engine.

A balancing shaft can be driven by a gear. It is particularly well known to provide a scissors gear to balancing shaft so as to prevent backlash between driving and following gears due to rotational speed variations.

The scissors gear generally comprises a main gear, an auxiliary gear, and a scissors spring housed in a cavity defined between the main and auxiliary gears, so as to lessen the amount of backlash.

Scissors gear is supported by a rolling bearing, the main gear being press-fitted onto an outer cylindrical surface of an outer massive ring of the rolling bearing while the auxiliary gear is mounted with a loose-fit onto the cylindrical surface. An inner ring of the rolling bearing is mounted onto a portion of the balancing shaft.

Basically, the outer ring comprises an axial blocking flange to maintain axially the auxiliary gear. However, a massive ring provided with such cylindrical surface and flange means a grinding process on the outer ring diameter to optimize the mounting process. Moreover, such massive ring is relatively expensive.

BRIEF SUMMARY OF THE PRESENT INVENTION

It is desirable to provide a massive outer ring to rolling bearing that is easy to manufacture, of reduced material and manufacturing costs, and suitable to support a scissors gear.

To this end, the invention relates to a bearing assembly comprising a rotating shaft and a rolling bearing having an inner ring mounted on the rotating shaft, an outer massive ring defining two front surfaces, an inner bore and an outer cylindrical surface, and at least one row of rolling elements radially housed between the inner and outer rings. The bearing assembly further comprises a scissors gear having a main gear press fitted onto the outer cylindrical surface of outer massive ring, an auxiliary gear mounted with loose fit onto the outer cylindrical surface, and a scissors spring arranged between the main and auxiliary gears. An axial retaining arrangement is further provided between the outer ring of rolling bearing and scissors gear, the auxiliary gear being axially blocked between the axial retaining arrangement and main gear.

According to the invention, the axial retaining arrangement consists in a combination of an annular radial groove provided to the outer massive ring and a shield mounted in the groove. The annular radial groove is disposed at one axial end of the inner bore of outer massive ring and axially opposite to the main gear, and is circumferentially radially open to the bore. The shield is annular, and successively comprises a first radial outer portion, a first axial portion extending axially outwardly from the first radial portion, a second radial portion extending radially inwardly from the first axial portion, and a second axial portion extending axially inwardly from the second radial portion and extended by a plurality of bent tongues. The tongues are mounted in the annular groove, the second radial portion bearing against a front surface of outer massive ring, the first axial portion bearing against a portion of the outer cylindrical surface of outer massive ring, and the first radial portion radially protruding from the outer cylindrical surface of outer massive ring so as to form an axial stop for the auxiliary gear.

Thanks to this invention, the annular groove is easy to manufacture in a grinded bore of the outer massive ring. The outer cylindrical surface is grinded with no other additional step. Moreover, one can use a standard rolling bearing with inner grooves that are generally dedicated to receive sealing means. It reduces the manufacturing and material costs of ring.

The washer is provided with an elastically deformable inner portion, with a plurality of tongues. Then the inner portion of shield is easily axially mountable within the annular groove.

The tongues are bent and then are suitable to be axially blocked between edges defined by the annular groove. The second radial portion is in axial abutment against a front surface of outer ring. The shield is then securely fixed with the outer ring.

The outer portion of shield is annular and cooperates with the auxiliary gear of scissors gear. Then the gear body mounted with loose fit onto the outer ring is axially maintained.

According to further aspects of the invention which are advantageous but not compulsory, such a manufacturing method of a bearing ring may incorporate one or several of the following features:

- The rolling elements are balls.
- Two axially adjacent rows of rolling elements are radially arranged between the inner and outer rings of rolling bearing.
- The rolling elements are circumferentially maintained by a cage.
- The edge of annular groove on the front surface comprises a sloped surface so as to ease the insertion of the bent tongues of shield in the groove.
- The rotating shaft is a balancing shaft.

BRIEF DESCRIPTION OF THE DRAWINGS

The invention will now be explained in correspondence with the annexed figures, as illustrative examples, without restricting the object of the invention. In the annexed figures.

DETAILED DESCRIPTION OF THE PRESENT INVENTION

Figure 1:
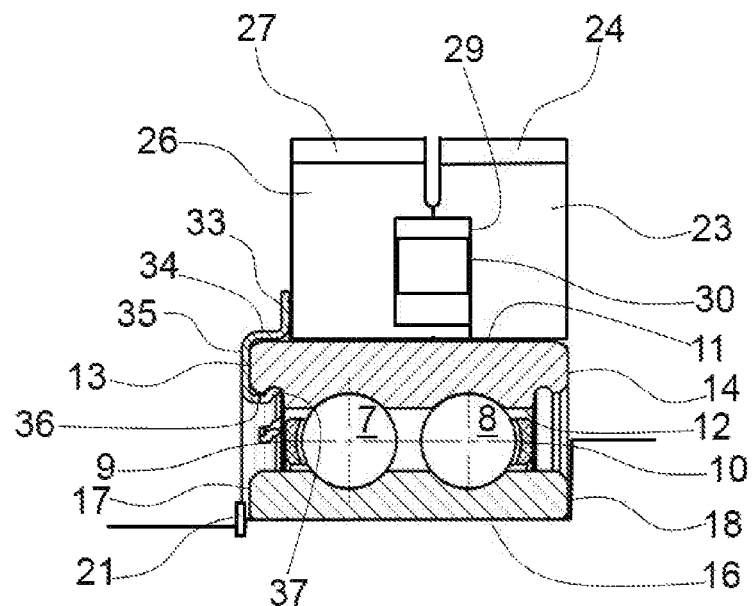
FIG. 1 presents a sectional view of a bearing assembly according to the invention.
Figure 2:
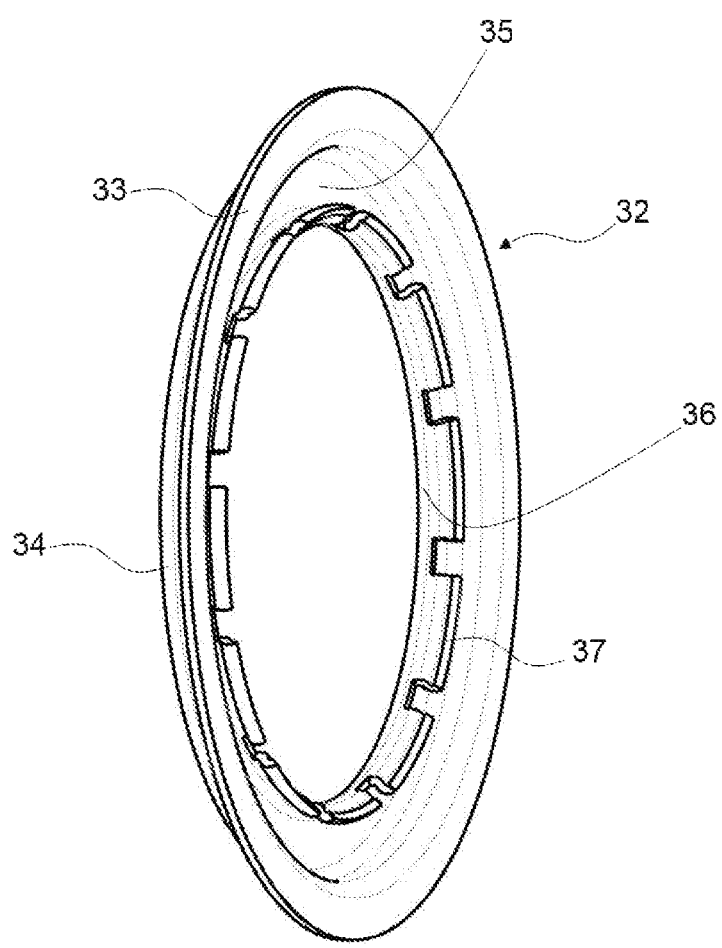
FIG. 2 presents a perspective view of a shield according to the invention.

A bearing assembly 1 is represented on FIG. 1, in particular for use with a balancing shaft in a piston engine of a motor vehicle, the shaft being an eccentric weighted shaft that offsets vibrations in the engine.

The assembly 1 comprises a stepped rotating shaft 2, here a balancing shaft, a rolling bearing 3, here a double row ball bearing, and a scissors gear 4. Shaft 2, bearing 3 and scissors gear 4 are centered on a common longitudinal axis X1.

Hereinafter, to facilitate the special identification of the assembly 1 for this figure and for the following ones, the adjectives "radial" and "axial" and the adverbs "radially" and "axially" are defined relative to the axis X1. Thus, an axial portion or part is parallel to the axis X1, whilst a radial portion or part is perpendicular to the axis X1.

Bearing 3 with central axis X1 comprises an outer ring 5, an inner ring 6, two rows of rolling elements 7 and 8, here balls, arranged in parallel planes held by cages 9 and 10, respectively. The rings 5, 6 are coaxial with the central axis X1 in the normal operating mode.

The outer ring 5 comprises an outer cylindrical surface 11, a bore 12 wherein two concave raceways are formed for the balls 7, 8, and two front surfaces 13, 14.

The inner ring 6 comprises an outer cylindrical surface 15 wherein are formed two concave raceway for the balls 7, 8, a bore 16, and two front surfaces 17, 18.

The rings 5, 6 are massive. A "massive ring" is to be understood as a ring obtained by machining with removal of material, in particular by grinding, from metal tube stock, rough forging and/or rolled blanks.

Alternatively, the rolling bearing 3 may comprise other types of rolling elements than balls, for example rollers or needles. Alternatively, the rolling bearing 3 may comprise only one row of rolling elements.

Rotating shaft 2 with central axis X1 is stepped. Shaft 2 comprises an outer cylindrical surface 19 on which the bore 16 of inner ring 6 of bearing 3 is press fitted. The surface 19 is axially defined between a groove 20 wherein a ring 21 is provided so as to axially block the inner ring 6 in a first axial direction, and a shoulder 22 so as to axially block the inner ring 6 in a second axial direction. Rolling bearing 3 is then securely fixed to rotating shaft 2.

Scissors gear 4 is arranged radially opposite to rotating shaft 2 with respect to rolling bearing 3. Scissors gear is mounted on outer cylindrical surface 11 of outer ring 5 of rolling bearing 3.

Scissors gear 4 comprises a main gear 23 provided with outer teeth 24 and an inner bore 25 press fitted on the outer cylindrical surface 11 of outer ring 5. Scissors gear 4 also comprises an auxiliary gear 26 provided with outer teeth 27 and an inner bore 28 mounted with loose fit onto the outer cylindrical surface 11 of outer ring 5, the auxiliary gear 26 being axially adjacent to main gear 23. A cavity 29 is defined between the main and auxiliary gears 23, 26, wherein a scissors spring 30 is housed.

According to the invention, the axial retaining arrangement is further provided between outer ring 5 of rolling bearing 3 and scissors gear 4 so as to axially block the freely mounted auxiliary gear 26 between the axial retaining arrangement and main gear 23.

The axial retaining arrangement consists in a combination of an annular radial groove 31 provided to the outer ring 5 and a shield 32 mounted in the groove 31.

The annular radial groove 31 is disposed on bore 12 of outer ring 5, on the axial side of front surface 13, and is axially opposite to the main gear 23. Groove 31 is open radially to the bore 12.

The shield 32 is annular, and successively comprises a first radial outer portion 33, a first axial portion 34 extending axially outwardly from the first radial portion 33, a second radial portion 35 extending radially inwardly from the first axial portion 33, and a second axial portion 36 extending axially inwardly from the second radial portion 35 and extended by a plurality of bent tongues 37.

The bent tongues 37 are mounted in the annular groove 31 of bore 5 of outer massive ring 5, the second radial portion 35 bearing against the front surface 13 of outer massive ring 5, the first axial portion 34 bearing against a portion of the outer cylindrical surface 11 of outer massive ring 5, and the first radial portion 33 radially protruding from the outer cylindrical portion 11.

The groove 31 is pre-formed, and the tongues are elastically deformed by axial insertion into the groove. Advantageously, the edge of groove 31 on the axial side of insertion is provided with a sloped surface 38 so as to ease the insertion of shield 32.

The shield 32 is then securely fixed with the outer ring 5.

The first radial portion 33 of shield 32 radially protrudes from the outer cylindrical surface 11 of outer ring 5 so as to form an axial stop for the auxiliary gear 26. The freely mounted auxiliary gear 26 is then axially blocked in a first axial direction by the axial portion 33 of shield 32 that is securely fixed with the outer ring 5 of rolling bearing 3, and in a second axial direction by the main gear 23 that is press fitted onto the outer cylindrical surface 11 of the outer ring 5.

Representative, non-limiting examples of the present invention were described above in details with reference to the attached drawings. This details description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies.

Moreover, various features of the above-described representative examples, may be combined in ways that are not specifically and explicitly enumerated in order to provide additional useful embodiments of the present teachings.

What is claimed is:

1. A bearing assembly comprising: a rotating shaft;
   a rolling bearing having an inner ring mounted on the rotating shaft, an outer massive ring defining two front surfaces, an inner bore and an outer cylindrical surface, and at least one row of rolling elements radially housed between the inner ring and outer ring;
   a scissors gear having a main gear press fitted onto the outer cylindrical surface of the outer massive ring, an auxiliary gear loosely mounted onto the outer cylindrical surface, and a scissors spring arranged between the main gear and the auxiliary gear; and
   an axial retaining arrangement between the outer massive ring of the rolling bearing and the scissors gear, the auxiliary gear being axially blocked between the axial retaining arrangement and the main gear,
   wherein the axial retaining arrangement consists of:

an annular radial groove disposed at one axial end of the inner bore of the outer massive ring and axially opposite to the main gear, and circumferentially radially open to the inner bore, and an annular shield that successively comprises:

a first radial outer portion, a first axial portion extending axially outwardly from the first radial outer portion, and a second radial portion extending radially inwardly from the first axial portion, a second axial portion extending axially inwardly from the second radial portion and extended by a plurality of bent tongues, wherein the tongues are mounted in the annular groove, wherein the second radial portion bearing resides against a front surface of outer massive ring, wherein the first axial portion bearing resides against a portion of the outer cylindrical surface of the outer massive ring, and wherein the first radial portion radially protrudes from the outer cylindrical surface of outer massive ring so as to form an axial stop for the auxiliary gear.

2. The bearing assembly according to claim 1, wherein the rolling elements are balls.

3. The bearing assembly according to claim 2, wherein two axially adjacent rows of rolling elements are radially arranged between the inner ring and the outer ring of rolling bearing.

4. The bearing assembly according to claim 3, wherein the rolling elements are circumferentially maintained by a cage.

5. The bearing assembly according to claim 2, wherein the rolling elements are circumferentially maintained by a cage.

6. The bearing assembly according to claim 2, wherein an edge of the annular groove on the front surface comprises a sloped surface so as to ease the insertion of the bent tongues of the annular shield in the annular groove.

7. The bearing assembly according to claim 2, wherein the rotating shaft is a balancing shaft.

8. The bearing assembly according to claim 1, wherein two axially adjacent rows of rolling elements are radially arranged between the inner ring and the outer ring of rolling bearing.

9. The bearing assembly according to claim 8, wherein the rolling elements are circumferentially maintained by a cage.

10. The bearing assembly according to claim 8, wherein an edge of the annular groove on the front surface comprises a sloped surface so as to ease the insertion of the bent tongues of the annular shield in the annular groove.

11. The bearing assembly according to claim 8, wherein the rotating shaft is a balancing shaft.

12. The bearing assembly according to claim 1, wherein the rolling elements are circumferentially maintained by a cage.

13. The bearing assembly according to claim 12, wherein an edge of the annular groove on the front surface comprises a sloped surface so as to ease the insertion of the bent tongues of the annular shield in the annular groove.

14. The bearing assembly according to claim 1, wherein an edge of the annular groove on the front surface comprises a sloped surface so as to ease the insertion of the bent tongues of the annular shield in the annular groove.

15. The bearing assembly according to claim 14, wherein the rotating shaft is a balancing shaft.

16. The bearing assembly according to claim 1, wherein the rotating shaft is a balancing shaft.

* * * * *